(12) United States Patent
Barathalwar

(10) Patent No.: US 9,191,975 B2
(45) Date of Patent: Nov. 17, 2015

(54) IDENTIFICATION-ASSISTED WIRELESS NETWORK CONNECTIONS

(75) Inventor: Raguraman Barathalwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,601

(22) PCT Filed: Sep. 30, 2011

(86) PCT No.: PCT/US2011/054362
§ 371 (c)(1),
(2), (4) Date: Jun. 12, 2013

(87) PCT Pub. No.: WO2013/048462
PCT Pub. Date: Apr. 4, 2013

(65) Prior Publication Data
US 2014/0200030 A1    Jul. 17, 2014

(51) Int. Cl.
| | | |
|---|---|---|
| *H04W 24/00* | (2009.01) | |
| *H04W 76/02* | (2009.01) | |
| *H04W 4/02* | (2009.01) | |
| H04W 64/00 | (2009.01) | |
| H04W 48/12 | (2009.01) | |

(52) U.S. Cl.
CPC .............. *H04W 76/02* (2013.01); *H04W 4/025* (2013.01); *H04W 48/12* (2013.01); *H04W 64/00* (2013.01)

(58) Field of Classification Search
USPC ........ 455/456.2, 456.1, 435.2, 436, 417, 565, 455/415; 370/328, 331, 338; 379/88.2, 379/213.01; 713/323; 709/204, 222
See application file for complete search history.

(56) References Cited

U.S. PATENT DOCUMENTS

| | | | | |
|---|---|---|---|---|
| 2005/0286476 | A1* | 12/2005 | Crosswy et al. | 370/338 |
| 2007/0032225 | A1* | 2/2007 | Konicek et al. | 455/417 |
| 2008/0175187 | A1* | 7/2008 | Lowry et al. | 370/328 |
| 2009/0172438 | A1* | 7/2009 | Kumar et al. | 713/323 |
| 2011/0279323 | A1* | 11/2011 | Hung et al. | 342/451 |

FOREIGN PATENT DOCUMENTS

WO    WO-2013048462 A1    4/2013

OTHER PUBLICATIONS

"International Application Serial No. PCT/US2011/054362, Search Report mailed May 16, 2012", 3 pgs.
"International Application Serial No. PCT/US2011/054362, Written Opinion mailed May 16, 2012", 3 pgs.

* cited by examiner

*Primary Examiner* — Charles Appiah
*Assistant Examiner* — Alexander Yi
(74) *Attorney, Agent, or Firm* — Schwegman Lundberg & Woessner, P.A.

(57) ABSTRACT

Systems and methods for transmitting location-specific information such as wireless network connectivity information are generally disclosed herein. One embodiment includes device configurations and techniques implemented to establish a secondary wireless network connection to exchange the location-specific information between a location-unaware device and a location-unaware device. In other embodiments, the location-specific information exchanged via the secondary wireless network connection includes the transfer of the connectivity information, such as a Service Set Identifier (SSID) or network authentication information, from a primary network-aware device to establish a primary network connection at a primary network-unaware device.

20 Claims, 5 Drawing Sheets

IDENTIFICATION-ASSISTED WIRELESS NETWORK CONNECTIONS

This application is a U.S. National Stage Filing under 35 U.S.C. 371 from International Patent Application Serial No. PCT/US2011/054362, filed on Sep. 30, 2011, the benefit of priority of which is claimed hereby, and is incorporated by reference herein in its entirety.

TECHNICAL FIELD

Embodiments pertain to wireless communications. Some embodiments relate to the use of wireless communication standards for wide and local area networks, such as standards from the IEEE 802.11 standards family.

BACKGROUND

A variety of devices may become unaware of location-specific information needed to perform operations. For example, one non-limiting use of location-specific information includes connectivity information to establish or re-establish a wireless network connection. When a wireless-network device (such as a personal computer (PC)) awakes or resumes from a standby power state, the device will attempt to reconnect to a wireless network. For devices connecting to a wireless network in an unknown location (e.g., a Wi-Fi network operating according to one of the standards of the IEEE 802.11 standards family, such as IEEE standard 802.11-2007), however, the amount of time needed to reconnect to a wireless network may be as much as 2-3 minutes to perform a scan for available wireless networks in vicinity of the device, identify the appropriate network to re-connect to, and establish the connection with the wireless network. Further, the connection process may need additional time for user involvement to authenticate to or select the appropriate wireless network. A significant amount of the connection time process may be consumed by performance of a wireless network scan, even if the user is aware of the wireless network Service Set Identifier (SSID) or has another device connected to the wireless network.

DETAILED DESCRIPTION

Figure 1:
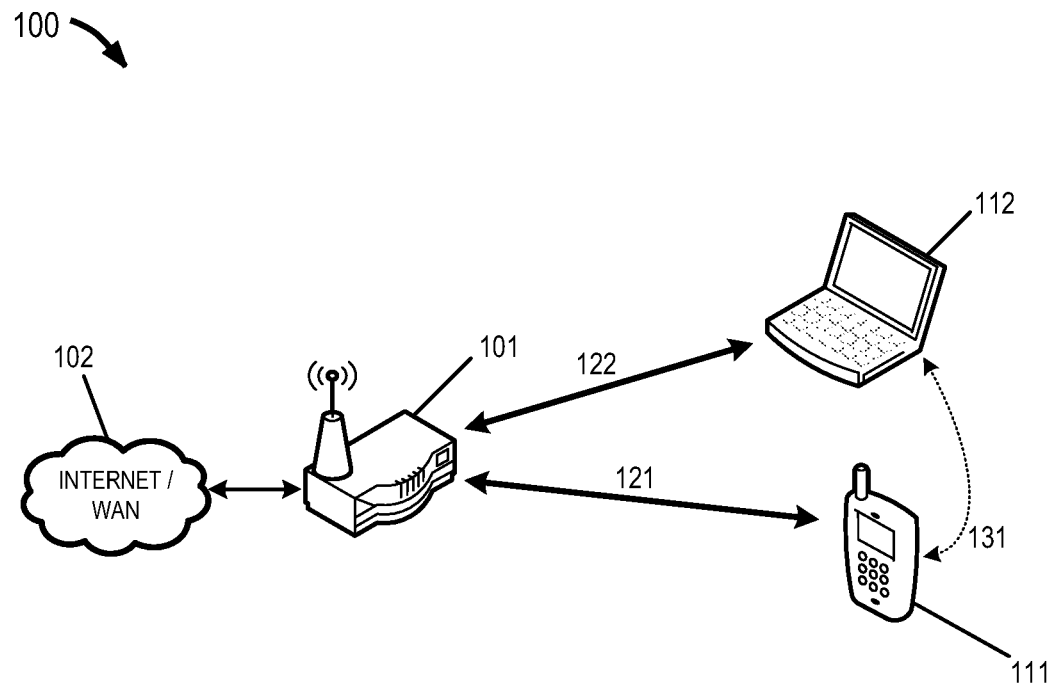
FIG. 1 illustrates a mobile communication framework including a primary network connection and a secondary network connection for devices operating in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Several of the embodiments described herein describe specific techniques for offloading the access and retrieval of location-based information to another device. In particular, this may include performing the access and retrieval of location-based information such as the identifier of a preferred wireless network from an associated mobile device for use by another computing system. Offloading the access and retrieval of this location-based information to the associated mobile device may reduce the amount of time needed to reconnect the computing system to the preferred wireless network from a standby state, and generally provide location-related information to the computing system that may not otherwise be known or discoverable.

Many users carry a location-aware device in addition to a location-unaware device that are both connected to at least one common network. For example, many users carry location-aware mobile devices (such as a smartphone having location-determination functionality provided in a Global Positioning System (GPS) receiver or the like) enabled with phone network and local area network (e.g., Wi-Fi) connectivity. Location-unaware devices, such as some portable notebook/laptop computers, netbooks, or tablets, however, may be enabled for Wi-Fi only, and generally do not include a GPS receiver or built-in location-aware capabilities.

In relation to Wi-Fi wireless network connectivity, existing techniques for determining the appropriate wireless network to connect or re-connect to each fail to address a number of scenarios. For example, when the user travels to another location and attempts to use a location-unaware device, the user may not immediately know which Wi-Fi network exists or is preferred. The user will then perform a network scan, and identify and authenticate to the Wi-Fi network. This process much be conducted even if the user has already connected his or her location-aware device (e.g., a smartphone) to the Wi-Fi network.

One problem particularly amplified by the standby state of a computing device is the amount of time need to perform a comprehensive wireless network scan, and identify potential Wi-Fi access points for network connection. A potential workaround to the time consumed by a network scan may include performing wireless scans at repeated intervals by the computer system. Performing a wireless scan or wireless network detection while a computer is in a standby state consumes power, however, and does not necessarily factor user requirements, authentication information, or whether the user has established connectivity in another device.

A variation to problems encountered when attempting to connect with networks in new locations may also occur when the available wireless network identifier or the network's authentication information changes. The wireless network identifier transmitted in a wireless network operating according to IEEE standard 802.11-2007 is referred to as a SSID element, and may be provided as a broadcasted information element used to indicate the identity of an extended service set (ESS) (e.g., for an infrastructure access point network) or an independent basic service set (IBSS) (e.g., for an ad-hoc network). Although many operating systems are configured to automatically connect to previously connected wireless networks with a known SSID, connectivity will not be established where a new SSID is encountered, or where the network's SSID or authentication information has changed.

In one embodiment, the determination of location-specific information (such as Wi-Fi connectivity information) may be provided by a location-aware computing device to a location-unaware device via a known or previously established secondary wireless network connection. This secondary wireless network connection may include the use of one or more local or personal area network protocols, such as Wi-Fi, Bluetooth, and the like. For example, the location-unaware device, such as a portable PC, may be configured to automatically contact the location-aware device, a smartphone, when new location-specific information is required, such as when the portable PC resumes from a standby power state and is unable to connect to a previously known wireless network identifier. The portable PC may also be configured to automatically query the smartphone at regular intervals to determine if location-specific information has changed.

In a further embodiment, the location-specific information is determined by a smartphone operating in proximity to a portable PC. The smartphone may communicate with the portable PC using any of a number of connection types and networks, such as with a Bluetooth or Wi-Fi connection, using a known or previously established connection. For example, the smartphone may communicate with the portable PC to offload various levels of network selection logic to a phone and obtain the location-specific information relative to the network selection. In addition, location-specific functionality such as GPS coordinates provided by the smartphone may be used to perform a lookup of location-specific information from a service or database hosted by the smartphone or connected via a network to the smartphone.

FIG. 1 provides an illustration of an example configuration 100 of network-connected devices operating in connection with one example embodiment. As illustrated, a wireless network access point 101, which is connected to the Internet or another Wide Area Network 102, provides wireless communications via respective wireless network connections 122, 121 to a first computing device (portable PC) 112 and a second computing device (smartphone) 111. For example, the wireless network access point 101 may communicate via the respective wireless network connections 121, 122 using an 802.11 (Wi-Fi) wireless network standard.

The smartphone 111 and portable PC 112 are connected via a secondary wireless network connection 131 to provide a conduit for the transfer of location-specific information. As illustrated, secondary wireless network connection 131 provides a direct connection between smartphone 111 and portable PC 112, although indirect, intermediary, or peer-to-peer connections may also be used to establish the secondary wireless network connection 131. The secondary wireless network connection 131 is configured to communicate the location-specific information between the smartphone 111 and the portable PC 112, whether in the form of requests or responses between the devices.

In one embodiment, the secondary wireless network connection 131 between the smartphone 111 and the portable PC 112 is established through a soft access point Wi-Fi connection hosted by the smartphone 111. For example, the portable PC 112 may be configured to automatically establish or reconnect a wireless network connection to the soft access point hosted by the smartphone 111, the soft access point being identified from the portable PC 112 with a previously known SSID. Upon establishment of the soft access point Wi-Fi connection (secondary network connection 131), various location-specific information (which may include the SSID of the wireless network access point 101 at the device location) may be communicated to the portable PC 112.

Thus, in one embodiment, the secondary wireless network connection 131 is established to transmit location-specific information that facilitates the establishment of the primary wireless network connection 122 between the portable PC 112 and the primary wireless network access point 101. However, it will be evident from the various descriptions herein that the steps performed to establish a secondary connection between the various illustrated devices may vary, and likewise the uses of this secondary connection may extend beyond the transfer of location-specific information.

In an example embodiment, modifications may be provided to one or both of the location-aware device (e.g., smartphone 111) or the location-unaware device (e.g., portable PC 112) to implement the transfer of relevant data between the devices and automatically establish the primary and secondary wireless network connections. This may include adapting various components of wireless network adapters, or the use of network configuration managers to establish connectivity via a secondary wireless network connection, and use the location-specific information to establish connectivity via a primary wireless network connection as appropriate.

Figure 2:
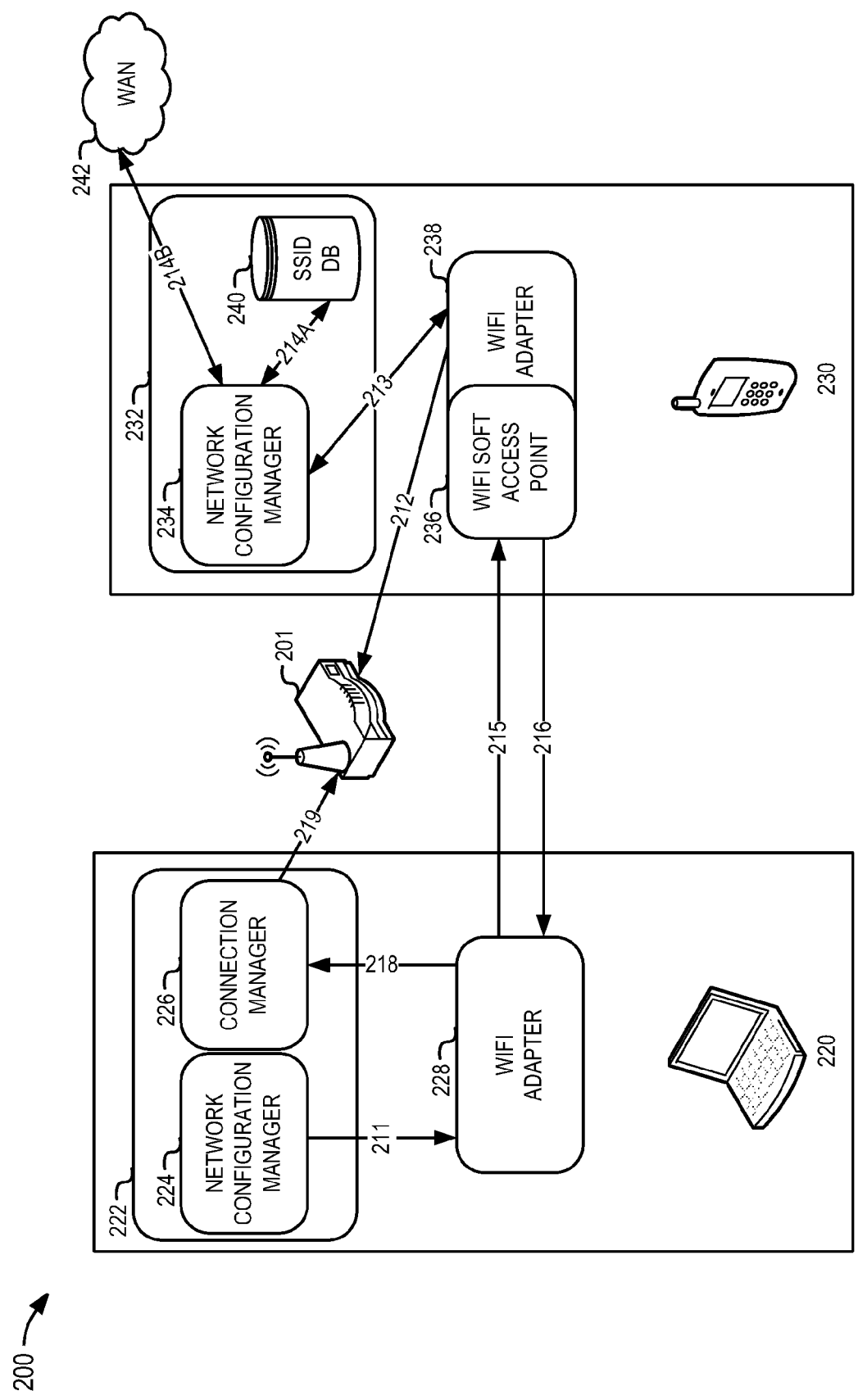
FIG. 2 illustrates a block diagram of various components used to implement identification-assisted wireless network connections according to one example embodiment.

FIG. 2 illustrates an example configuration 200 of various components and operations used to implement an identification-assisted primary wireless network connection (flow 219) from a location-unaware device, a portable PC 220, using location-specific information communicated from a location-aware computing device, namely a smartphone 230. As shown, the portable PC 220 includes a location information component 222 adapted for processing location-specific network information, having a network configuration manager 224 and connection manager 226. The network configuration manager 224 is configured to request location-specific information (flow 211) using a secondary network connection established with the Wi-Fi adapter 228.

In one embodiment, this location-specific information is a wireless network identifier (and in a further embodiment, authentication information) of a primary network. Thus, as illustrated, the connection manager 226 is configured to receive and process primary network location-specific information (flow 218) for use in establishing the identification-assisted primary wireless network connection (flow 219) to primary network access point 201.

The secondary wireless network connection (flows 215, 216) used to obtain the location-specific information may be established as follows. On the portable PC 220, the Network Configuration Manager 224 provides the known network information (e.g., SSID) of the smartphone Wi-Fi Soft Access Point 236 into the PC Wi-Fi adapter 228 (flow 211). This SSID may be previously input by a user or transmitted to the portable PC 220 using any of a number of techniques.

Next, the secondary wireless network connection may be established between the portable PC 220 and the smartphone 230. For example, when the portable PC 220 resumes from a power-standby state, the Wi-Fi adapter 228 may be configured to perform a direct scan to the SSID of the Wi-Fi Soft Access Point 236 to establish a connection to the secondary wireless network (flow 215), instead of performing a scan for all available SSIDs. The Wi-Fi adapter 228 may, for example, retrieve the location-specific information from a probe response (flow 216), and provide the location-specific information to another component in the location information component 222 (such as connection manager 226, used to extract and use the wireless network information for establishing the primary network connection (flow 219) with the primary network access point 201).

On the smartphone 230, location-specific information may be obtained for transfer to the portable PC 220 and other connected devices in connection with the following sequence. For example, for location-specific information relevant to the primary wireless network connection, a Wi-Fi adapter 238 obtains Wi-Fi network information via an existing primary network connection to the primary network access point 201 (flow 212) or a scan to identify the primary network access point 201. The Wi-Fi adapter 238 may also request information from other entities in the location information component 232.

In one embodiment, a location information component 232 includes network configuration manager 234. The network configuration manager 234 is configured for determining the right network which either or both of the portable PC 220 or the smartphone 230 should connect to. This process may include any number of automated or manual techniques. Although the following discusses automated techniques for selecting a network based on retrieved information from a database, service, or network scan, it will be understood that a user may also manually establish a connection to a user-preferred network and manually input authentication information through use of various interfaces to smartphone 230.

In one example embodiment, the network configuration manager 234 performs a series of scans (e.g., flow 212) with use of Wi-Fi adapter 238. The preferred Wi-Fi identifier may be identified by name or network characteristics. For example, the preferred Wi-Fi network might be an open network, or an SSID obtained from a listing or data store accessed by smartphone 230, to enable the smartphone 230 or other devices such as portable PC 220 to establish a connection. This network identifier and other and network connection information may be retrieved with other location-specific information (such as a GPS coordinate determined by the smartphone 230) using database 240 (flow 214a). Alternately or in conjunction with a database interaction (flow 214a), a connection to a service or external database (flow 214b) accessible via a wide area network 242 such as the Internet (e.g., through the smartphone's phone data connection) may be used to obtain the location-specific information.

In connection with the aforementioned manual or automated techniques, the network configuration manager 234 may be configured to provide network connectivity information, such as SSID, authentication information, and the like, for connections to the primary network access point 201. This information, once collected, may be communicated to the Wi-Fi adapter 238 (flow 213), and ultimately transmitted to another computing device (namely, the portable PC 220) via secondary network connections (e.g., flows 215 and 216) for use in establishing connectivity to the primary network access point 201.

As illustrated, the smartphone 230 may host a Wi-Fi soft access point 236 in connection with the Wi-Fi adapter 238 to establish secondary network connections with one or more location information-receiving devices such as the portable PC 220. For example, when obtaining relevant location-specific information (such as connectivity information for the primary network), the network configuration manager 234 may issue a command (flow 213) to the Wi-Fi adapter 238 to establish and broadcast a soft access point network using the Wi-Fi soft access point 236 for a small period of time.

As previously suggested, the SSID of the smartphone's Wi-Fi soft access point 236 is a known unique personal network identifier which the computing device (e.g., portable PC 220) is made aware of. Upon establishment of the connection between the portable PC Wi-Fi adapter 228 and the smartphone soft access point 236 initiated by the portable PC (flow 215), information may be communicated (flow 216) via this secondary wireless network connection. For example, a probe response may reply with the relevant primary network information (including the SSID and authentication information) to the requesting computing device to enable the requesting computing device to connect to the primary wireless network. In a further example embodiment, the communicated location-specific information may be encrypted.

In other embodiments, the location information component 222 on the location-unaware device (e.g., the portable PC 220) and the location information component 232 on the location-aware device (e.g., a smartphone 230) may be configured to provide other types of location information in lieu of or in addition to Wi-Fi network information. For example, the communication of GPS coordinates may be provided via the secondary network connection. The location-aware device may also perform additional network-based processing and lookups to provide context-specific information related to location. Additionally, location-based information may be directly provided to the location-unaware device to enable the location-unaware device to directly lookup the information.

Figure 3:
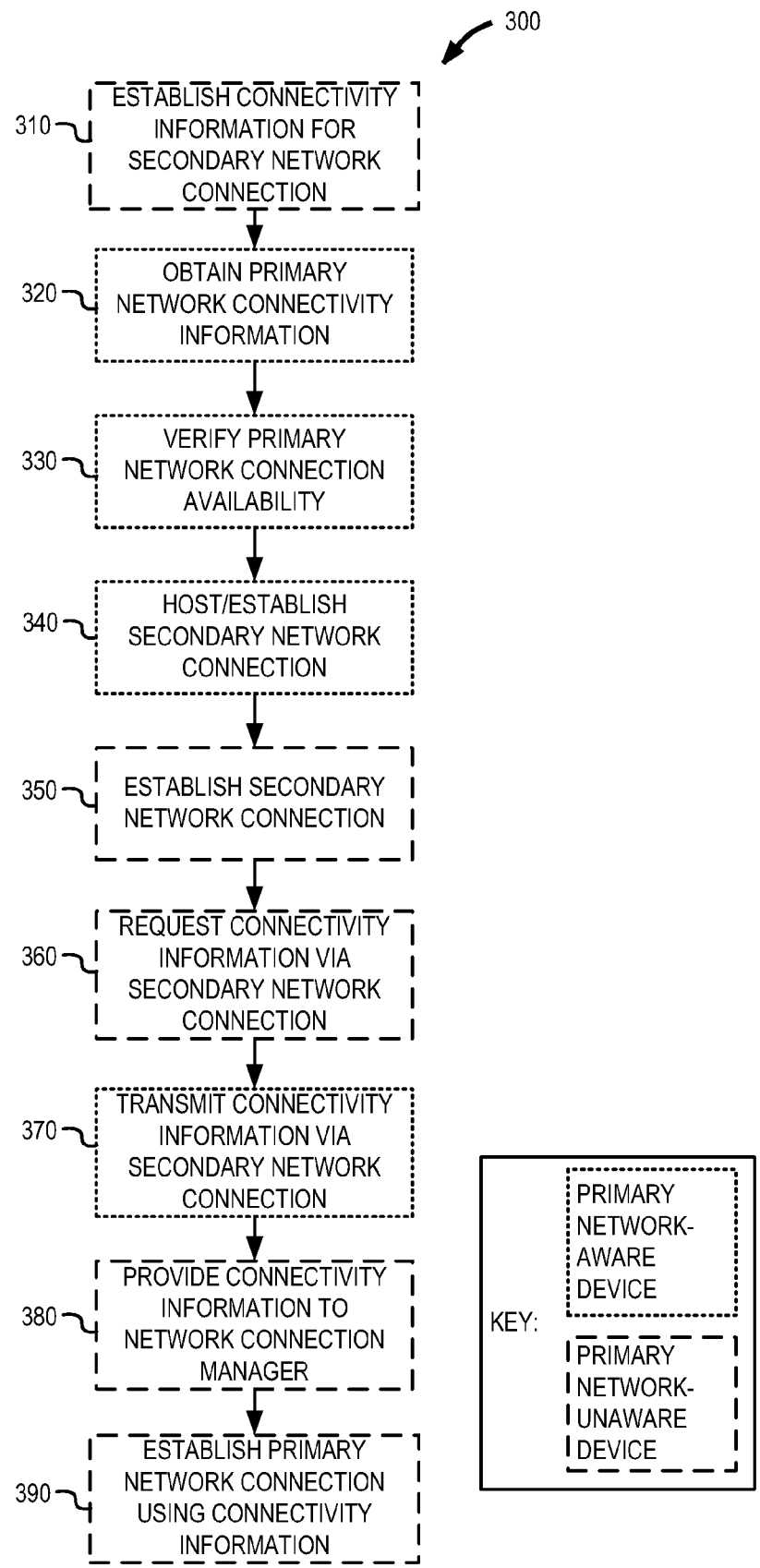
FIG. 3 is a flow diagram illustrating a method for providing primary network connectivity information to a primary network-unaware device according to one example embodiment.

FIG. 3 illustrates a flowchart of a method 300 for obtaining primary network connectivity information at a primary network-unaware device (e.g., a portable PC) using a secondary network connection to a primary network-aware device (e.g., a smartphone) according to one example embodiment. This method provides a further illustration of various steps being performed at the primary network-aware device (e.g., the location-aware device smartphone 230) versus the primary network-unaware device (e.g., the location-unaware device portable PC 220) previously described, although it will be apparent that the order and content of the illustrated method steps may vary from that illustrated and described.

As previously explained, the secondary network connection (e.g., a personal or limited local area network, such as a device-hosted soft Wi-Fi network or a Bluetooth connection network) may be used to transfer connectivity information for the primary network connection (e.g., another personal, local, or wide area network, such as an access point-hosted Wi-Fi network). To facilitate the secondary connection, the connection information for the secondary network connection is collected and established (such as through user input or an automated technique) at the primary network-unaware device (operation 310).

The various operations occurring at the primary network-aware device may include obtaining primary network connectivity information (operation 320), such as performing a scan of available networks, performing a location-based lookup of available primary networks based on geographic coordinates or known location, or using user-specified information and selection of a primary network. The primary network connection availability may be verified (operation 330) at the primary network-aware device, which may include having the primary network-aware device connect to the primary network, connect to a service, or ask for user verification of the primary network information.

The primary network-aware device may then host or establish a secondary network connection (operation 340) to the secondary network for access by the primary network-unaware device, using one or more of the previously described techniques, such as a device-hosted soft access point. The primary network-unaware device may then establish a secondary network connection (operation 350) to the primary network-aware device, and request connectivity information (operation 360) and other location information via the secondary network connection. The connectivity information may then be transmitted from the primary network-aware device (operation 370) via the secondary network connection.

Once the connectivity information for the primary network is transmitted or otherwise provided to the primary network-unaware device, this connectivity information may be provided to a network connection manager (operation 380) for use in establishing the primary network connection (operation 390).

Figure 4:
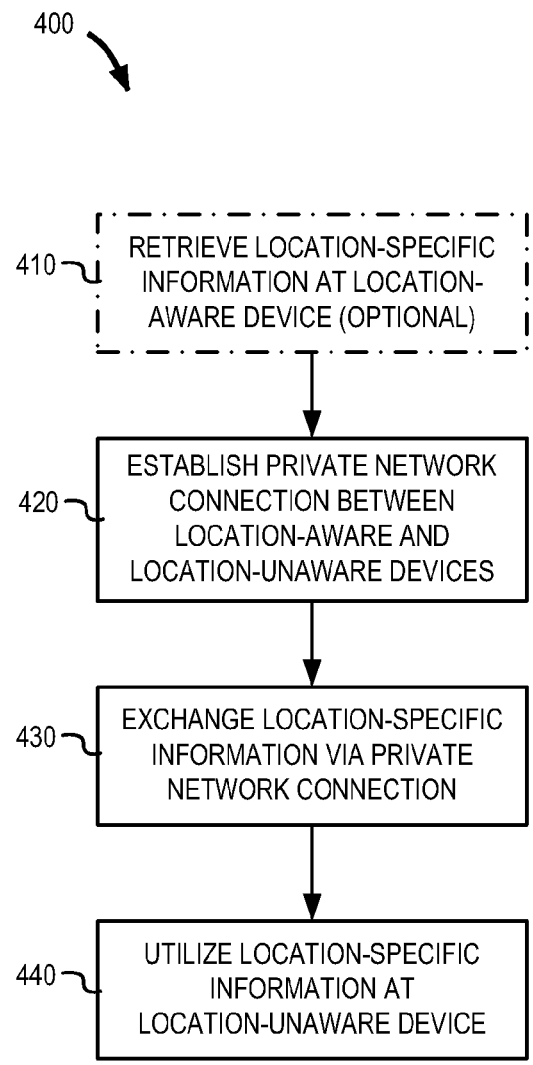
FIG. 4 is a flow diagram illustrating a method for providing location-specific information from a location-aware device to a location-unaware device according to one example embodiment.

FIG. 4 provides an illustration of a higher-level method 400 for obtaining location-specific information (which may or may not include primary network connectivity information) at a location-unaware device. As illustrated, an optional step performed at the location-aware device may include retrieving location-specific information. This retrieval may be performed with manual or automated techniques. Alternately, the location-aware device may provide the location-specific information as a result of internal processing (e.g., GPS coordinates from a built-in GPS receiver) or manual input from a user (e.g., network connectivity information provided by the user).

A private network connection (e.g., the secondary wireless network connection previously described) may be established between the location-aware and the location-unaware devices (operation 420). The location-specific information may be exchanged via the established private network connection (operation 430). Ultimately, the location-specific information may be utilized at the location-unaware device (operation 440) for any of a number of purposes, including but not limited to: establishing network connectivity, providing the location-specific information in connection with user interfaces or displays, and using the location-specific information with other services and processes.

The transfer of location-specific information and the establishment of the private network connection as described herein may occur at a variety of times, including at regular intervals or at predetermined times. For example, new connectivity information may be needed when a computing system resumes from a standby-power state, or when a previously active network connection is detected as being no longer active. Further, the transfer of location-specific information via the private network connection may also occur during low-power states of a computing device (such as during a standby state) to enable the computing device to maintain a primary network connectivity.

Embodiments may be implemented in one or a combination of hardware, firmware, and software. Embodiments may also be implemented as varying combinations of one or more devices, machines, or systems. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 5:
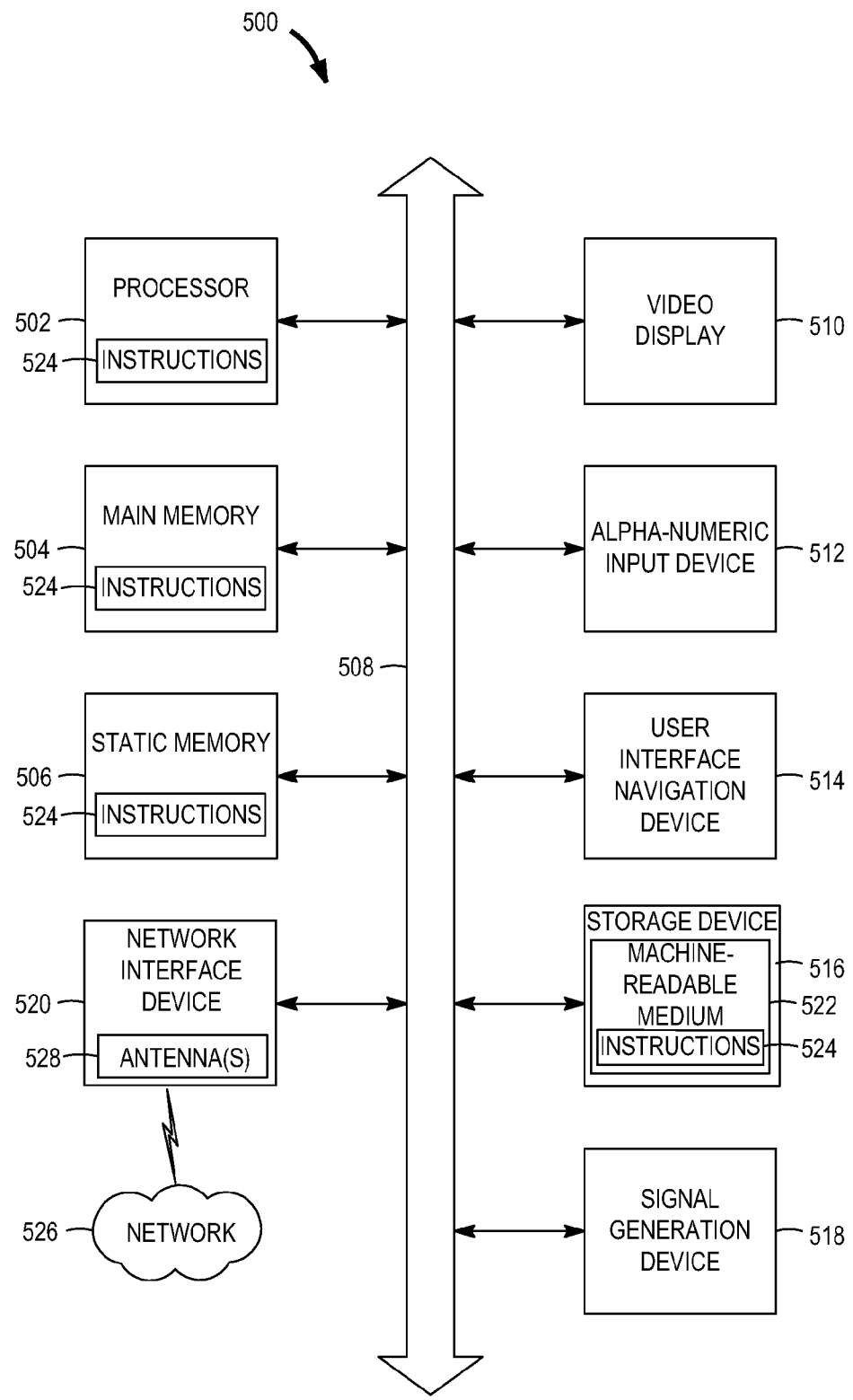
FIG. 5 illustrates a block diagram of an example machine upon which one or more embodiments can be implemented.

FIG. 5 is a block diagram illustrating an example machine upon which any one or more of the methodologies herein discussed can be run. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes a processor 502 (e.g., a central processing unit (CPU), a graphics processing unit (GPU) or both), a main memory 504 and a static memory 506, which communicate with each other via a bus 508. The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, and 4G LTE/LTE-A or WiMax networks). The term "transmission medium" shall be taken to include any intangible medium that is capable of storing, encoding, or carrying instructions for execution by the machine, and includes digital or analog communications signals or other intangible medium to facilitate communication of such software.

The use of specific devices such as the portable PCs and smartphones described herein to implement the presently described configurations and techniques are provided for illustration. It will be apparent that other computing devices configured with network connectivity may be substituted for such specific devices. Further, the location-specific information described herein is also provided as an illustration, and is not limited to wireless network connectivity information or GPS coordinates. Therefore, location-specific information may include any of a number of data types and information directly or indirectly associated with location characteristics and attributes.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A location-unaware mobile computing device configured for offloading a collection of location-specific information, the location-unaware mobile computing device comprising: circuitry to: request automatically, from a location-aware mobile computing device configured to determine a current location of the location-aware mobile computing device, location-specific information for the determined current location when the location-unaware mobile computing device is unable to connect to a previously known wireless network identifier; receive the location-specific information from the location-aware mobile computing device; and process the location-specific information; and a transceiver to: establish a peer-to-peer connection with the location-aware mobile computing device using a private wireless network; and request and receive from the location-aware mobile computing device the location-specific information via the peer-to-peer connection of the private wireless network; wherein the private wireless network is established by the location-aware mobile computing device to provide the location-specific information; wherein the location-specific information was: determined by the location-aware mobile computing device prior to receipt of the request from the location-unaware mobile computing device, and transmitted by the location-aware mobile computing device via the peer-to-peer connection of the private wireless network to the location-unaware mobile computing device in response to receipt of the request from the location-unaware mobile computing device; wherein the location-specific information includes connectivity information for a second wireless network whose coverage area includes a location of the location-unaware mobile computing device when the location-unaware mobile computing device transmitted the request; wherein the location-unaware mobile computing device does not know the current location of the location-unaware mobile computing device; wherein the location-unaware mobile computing device is further configured to use the connectivity information to establish a connection with the second wireless network; and wherein the location-specific information includes Global Positioning System (GPS) coordinates determined by the location-aware mobile computing device.

2. The location-unaware mobile computing device of claim 1, wherein the connectivity information includes one or both of a network identifier and authentication information for the second wireless network.

3. The location-unaware mobile computing device of claim 2, wherein the private wireless network is provided by the location-aware mobile computing device using an internal access point, wherein the private wireless network operates according to a standard from an IEEE 802.11 standards family, and wherein the network identifier is a Service Set Identifier (SSID).

4. The location-unaware mobile computing device of claim 2, wherein the location-aware mobile computing device is configured to determine the connectivity information at least in part by performing a scan of the second wireless network.

5. The location-unaware mobile computing device of claim 2, wherein the location-aware mobile computing device is configured to obtain the connectivity information from a database based on one or more location attributes.

6. The location-unaware mobile computing device of claim 1, wherein the private wireless network is a Bluetooth network.

7. The location-unaware mobile computing device of claim 1, wherein the location-aware mobile computing device is configured for operation as: a portable personal computer, a tablet computer, or a smartphone.

8. A location-aware mobile computing device for communicating location-specific information, the location-aware mobile computing device comprising: circuitry to: determine a current location of the location-aware mobile computing device; obtain location-specific information for the determined current location; and process an automatic request for the location-specific information offloaded from a requesting location-unaware mobile computing device when the location-unaware mobile computing device is unable to connect to a previously known wireless network identifier; and a transceiver to: establish a peer-to-peer connection with the requesting location-unaware mobile computing device using a private wireless network; and transmit the location-specific information via the peer-to-peer connection of the private wireless network; wherein the private wireless network is established by the location-aware mobile computing device to provide the location-specific information; wherein the location-aware mobile computing device is to transmit the location-specific information via the peer-to-peer connection of the private wireless network to the requesting location-unaware mobile computing device in response to receiving the request; wherein the location-specific information includes connectivity information for a second wireless network whose coverage area includes a location of the requesting location-unaware mobile computing device when the requesting location-unaware mobile computing device transmitted the request for location-specific information; wherein the location-unaware mobile computing device does not know the current location of the location-unaware mobile computing device; wherein the requesting location-unaware mobile computing device is further configured to use the connectivity information to establish a connection with the second wireless network; and wherein the location-specific information includes Global Positioning System (GPS) coordinates determined by the location-aware mobile computing device.

9. The location-aware mobile computing device of claim 8, wherein the connectivity information includes one or both of a network identifier and authentication information for the second wireless network.

10. The location-aware mobile computing device of claim 9, wherein the private wireless network is provided by the location-aware mobile computing device using an internal access point, wherein the private wireless network operates according to a standard from an IEEE 802.11 standards family, and wherein the network identifier is a Service Set Identifier (SSID).

11. The location-aware mobile computing device of claim 9, wherein the location-aware mobile computing device is configured to obtain the connectivity information at least in part by performing a scan of the second wireless network.

12. The location-aware mobile computing device of claim 9, wherein the location-aware mobile computing device is configured to obtain the connectivity information at least in part by accessing a database, the database providing connectivity information correlated to location.

13. The location-aware mobile computing device of claim 8, wherein collecting the location-specific information includes collecting Global Positioning System (GPS) coordinates provided by the location-aware mobile computing device, and wherein the location-specific information includes the GPS coordinates.

14. The location-aware mobile computing device of claim 9, wherein the private wireless network is a Bluetooth network.

15. A method for offloading a collection of location-specific information from a requesting location-unaware mobile computing device to a location-aware mobile computing device, the method comprising: establishing, by a requesting location-unaware mobile computing device, a peer-to-peer connection to a location-aware mobile computing device using a private wireless network, the location-aware mobile computing device configured to determine a current location of the location-aware mobile computing device; transmitting, by the requesting location-unaware mobile computing device to the location-aware mobile computing device via the peer-to-peer connection of the private wireless network, a request to obtain location-specific information for the determined current location that is unknown by the requesting location-unaware mobile computing device, the transmitting performed automatically when the location-unaware mobile computing device is unable to connect to a previously known wireless network identifier; and receiving the location-specific information from the location-aware mobile computing device via the peer-to-peer connection of the private wireless network; wherein the location-specific information is collected by the location-aware mobile computing device prior to the requesting location-unaware mobile computing device transmitting the request for the location-specific information; wherein the location-specific information includes connectivity information for a second wireless network whose coverage area includes the location of the location-unaware mobile computing device when the location-unaware mobile computing device transmitted the request for location-specific information, the second wireless network establishing communications among a plurality of devices; wherein the location-unaware mobile computing device does not know the current location of the location-unaware mobile computing device; wherein the requesting location-unaware mobile computing device is further configured to use the connectivity information to establish a connection with the second wireless network; and wherein the location-specific information includes Global Positioning System (GPS) coordinates determined by the location-aware mobile computing device.

16. The method of claim 15, wherein the connectivity information includes one or both of a network identifier and authentication information for the second wireless network.

17. The method of claim 16, wherein the wireless network is provided by the location-aware mobile computing device using an internal access point, wherein the wireless network operates according to a standard from an IEEE 802.11 standards family, and wherein the network identifier for the second wireless network is a Service Set Identifier (SSID).

18. The method of claim 16, further comprising obtaining at least part of the connectivity information by at least one of performing a scan of the second wireless network.

19. The method of claim 15, wherein the private network connection is established by the requesting location-unaware mobile computing device to obtain the location-specific information from the location-aware mobile computing device upon resuming the requesting location-unaware mobile computing device from a power-standby state.

20. The method of claim 15, wherein the location-aware mobile computing device is a smartphone, and wherein the requesting location-unaware mobile computing device is configured for operation as: a portable personal computer, a tablet computer, or a smartphone.

* * * * *